United States Patent
Kummamuru et al.

(10) Patent No.: US 8,135,579 B2
(45) Date of Patent: Mar. 13, 2012

(54) METHOD OF ANALYZING CONVERSATIONAL TRANSCRIPTS

(75) Inventors: Krishna Kummamuru, Hyderabad (IN); Deepak S. Padmanabhan, Kerala (IN)

(73) Assignee: International Business Machines Corporation, Armonk, NY (US)

(*) Notice: Subject to any disclaimer, the term of this patent is extended or adjusted under 35 U.S.C. 154(b) by 1014 days.

(21) Appl. No.: 12/061,705

(22) Filed: Apr. 3, 2008

(65) Prior Publication Data

US 2008/0181390 A1 Jul. 31, 2008

Related U.S. Application Data

(63) Continuation of application No. 11/614,200, filed on Dec. 21, 2006, now abandoned.

(51) Int. Cl.
*G10L 15/00* (2006.01)
(52) U.S. Cl. ..................................... 704/9; 379/265.06
(58) Field of Classification Search .. 704/9; 379/265.06
See application file for complete search history.

(56) References Cited

U.S. PATENT DOCUMENTS

| | | |
|---|---|---|
| 6,748,353 B1 | 6/2004 | Iliff |
| 6,922,466 B1 | 7/2005 | Peterson et al. |
| 7,306,560 B2 | 12/2007 | Iliff |
| 7,389,229 B2 | 6/2008 | Billa et al. |
| 7,487,095 B2 | 2/2009 | Hill et al. |
| 7,606,714 B2 | 10/2009 | Williams et al. |
| 7,912,714 B2 * | 3/2011 | Kummamuru et al. ........ 704/245 |
| 2004/0218751 A1 | 11/2004 | Colson et al. |
| 2005/0286705 A1 | 12/2005 | Contolini et al. |

OTHER PUBLICATIONS

Kummamuru et al., U.S. Appl. No. 11/614,200, IN920060079US1, Office Action Communication, Jan. 28, 2011, 6 pages.

Zweig, G. (IBM Thomas J. Watson Res. Center, USA); Siohan, O.; Saon, G.; Ramabhadran, B.; Povey, D.; Mangu, L.; Kingsbury, B. "Automated quality monitoring in the call center with ASR and maximum entropy" *2006 IEEE International Conference on Acoustics, Speech, and Signal Processing* (IEEE Cat. No. 06CH37812C), 2006,I-589-92.

Gilman A: Narayanan, B: Paul S. "Mining call center dialog data" *Management Information Systems*, v 10, *Data Mining V: Data Mining, Text Mining and their Business Applications*, 2004, p. 317-325.

Gilad Mishne, David Carmel, Ron Hoory, Alexey Roytman, Aya Soffer "Automatic Analysis of Callcenter Conversations" http://staff.science.uva.nl/~gilad/pubs/cikm05-callcenter.pdf CIKM, Oct. 31-Nov. 5, 2005.

Shourya Roy, L Venkata Subramaniam, "Automatic Generation of Domain Models for Call Centers from noisy transcriptions", Proceedings of COLING-ACL, 2006.

Kummamuru et al., U.S. Appl. No. 11/614,200, IN920060079US1, Office Action Communication, Sep. 29, 2010, 5 pages.

* cited by examiner

*Primary Examiner* — Susan McFadden
(74) *Attorney, Agent, or Firm* — Gibb I.P. Law Firm, LLC; Derek S. Jennings (57) ABSTRACT

Analyzing transcripts of conversation between at least two users by receiving input information from a first user via a voice call, creating conversational transcripts from the information received from the first user, selecting at least one defined situation from a list of defined situations, identifying the selected situation in the conversational transcripts, identifying a set of procedural sequences by comparing the at least one identified situation in the conversational transcripts with knowledge derived from a corpus of historical conversational transcripts; and providing the set of procedural sequences to the first user.

9 Claims, 6 Drawing Sheets

```
Sequence Mining on Call Corpora
Corpus = Total Collection of Calls;
Cluster Corpus by K-Means (K=k) to get Collections of Calls C = {$C_1$, $C_2$, ..., $C_k$};
For (i=1;i<=k;i++){
    $DSA_i$ = { p|υ(c ∈ $C_i$) s.t. p ∈ $c_{Agent}$}
    $DSC_i$ = { p|υ(c ∈ $C_i$) s.t. p ∈ $c_{Customer}$}
    Let $A_i$ be the clusters obtained using
      K-Means on $DSA_i$ with K=max(|DSAi|/10,10)
    Let $C_i$= be the clusters obtained using
      K-Means on $DSC_i$ with K=max(|DSAi|/10,10)
    For (every c ∈ $C_i$){
       Assign a sequence $S_c$ to c
         |$S_c$| = number of sentences in c;
         for(j=0; j < |$S_c$|; j++){
           s = $j^{th}$ sentence of c;
           if(s ∈ $c_{Agent}$)
Sc[j] = cluster in $A_i$ which contains s;
           else if(s ∈ $c_{Customer}$)
Sc[j] = cluster in $B_i$ which contains s;
         }
    }
SP = distinct & frequent sequences from the set of sequences { $S_c$ | ... c ∈ $C_i$}
    MinSupport = max(4 calls, 5% calls)
Output <representative terms for $C_i$, SP>
}
```

METHOD OF ANALYZING CONVERSATIONAL TRANSCRIPTS

CROSS-REFERENCE TO RELATED APPLICATIONS

This application is a continuation of U.S. application Ser. No. 11/614,200 filed Dec. 21, 2006, the complete disclosure of which, in its entirety, is herein incorporated by reference.

FIELD OF THE INVENTION

This invention relates to a method of analyzing conversational transcripts, preferably textual conversational transcripts, and in particular to analyzing and processing of unstructured data in such conversational transcripts.

DESCRIPTION OF THE RELATED ART

Call centers are centralized offices for the purpose of receiving and transmitting a large volume of requests by various communication channels like telephone, emails, and instant messages. A call centre is operated by a company to administer various types of support or information inquiries from customers. This call center model is becoming popular because it allows companies to be in direct touch with their customers. In such call centers a typical call center agent handles tens to hundreds of calls per day depending on the complexity of the issues that the agent is required to addresses. However, with advances in the area of speech recognition and the widespread deployment of speech recognition technology in call centers, relatively large volumes of data are produced everyday in the form of call transcripts. This is in addition to the data produced as a part of the process which include e-mail, instant messages (IM), reports from the agent, customer satisfaction surveys etc. In the sequel, the conversation (call) transcripts includes transcripts of conversations through various media like audio calls and IM/web-chat.

A typical call that an agent would receive and respond to at a call center consists of various phases. For example, a call to a call centre agent broadly consists of the following three phases: introduction part between the agent and the customer, seeking information about the problem, and providing solution to the problem of the customer. Agents in call centers typically use keyword search over manually authored knowledge bases to obtain useful information that could help them to solve the problem faced by the customer. The utility of such a system is limited by the smartness of the agent to enter the right keywords.

Knowledge authoring, or the act of populating the knowledge base is done manually. Because they are manually authored, these knowledge bases can not quickly adapt to the various kinds of new problems that arise during the course of time. Moreover, manual augmentation of such knowledge bases would consume tremendous manpower and may not be exhaustive. Identification of undocumented and effective sequences of steps would be impossible in the case of manual authoring of knowledge bases.

Without a way to improve the method of analyzing call transcripts, the promise of this technology may never be fully achieved.

SUMMARY OF THE INVENTION

According to a first aspect of the invention thereof, is described a method for analyzing transcripts of conversation between at least two users. Typically the call center agent is configured to receive input information from first user (customer, etc.) via a voice call. After receiving the call, conversational transcripts are created from the information received from the first user. Once the conversational transcripts have been created at least one defined situation from a list of defined situations is selected. The selected situation is identified in the conversational transcripts. After the situations has been identified, a set of procedural sequences is identified by comparing the at least one identified situation in the conversational transcript with knowledge derived from a corpus of historical conversational transcripts, which are preferably available in a corpus. The set of procedural sequence is provided to the first user. In a further embodiment, the set of procedural sequence may be provided to the second user (call center agent) and the second user can provide the procedural sequence to the first user.

According to a second aspect of the invention thereof, is a method for creating a document of procedural sequences from information received via an input call. Typically the call center agent is configured to receive input information from first user (customer, etc.) via a voice call. After receiving the call, conversational transcripts are created from the information received from the first user. Once the conversational transcripts have been created, at least one defined situation from a list of defined situations is selected. The selected situation is identified in the conversational transcripts. After the situations have been identified, a set of procedural sequences is identified by comparing the at least one identified situation in the conversational transcript with knowledge derived from a corpus of historical conversational transcripts, which are preferably available in a corpus. On negative determination, i.e., when the identified situation is not found in the historical conversational transcripts, the second user (call center agent) is prompted to create a document comprising a set of procedural sequences and add the set of procedural sequences into a repository. The document created is authored by the second user and such a document that is added into the repository can be advantageously used in identifying situations and providing procedural sequences to the identified sequences from the input call of the first user.

DETAILED DESCRIPTION

Overview

Collections and analysis of call transcripts are typically very diverse in the kind of predicament they address. The call transcripts are clustered initially to arrive at topical collections, which are collections of calls addressing a specific issue, where such topical collections are more homogeneous in nature and can be advantageously used for analysis of the call transcripts. Each such topical collection of calls is further split into two subsets, that of second user (hereinafter referred to as call center agent or simply agent) sentences and first user (also referred to as a customer) sentences. The two subsets are further clustered to build clusters which possibly containing sentences representative of similar procedural steps, where each cluster thus describes a sub-procedural step. An entropy-based measure to quantify the quality of a sub-procedural cluster is defined, and the entropy is used to measure the cluster quality and to refine clusters until good quality clusters are found. Once these clusters are obtained, each call in the topical collection can now be represented as a sequence of such clusters. The collection of calls, represented as sequences, are subjected to frequent pattern mining to discover frequent procedural sequences for a topical collection. Representative distinctive procedural sequences are determined from these frequent sequences, using for example, techniques such as leader clustering algorithms.

Method of Analyzing Conversational Transcripts

Figure 1:
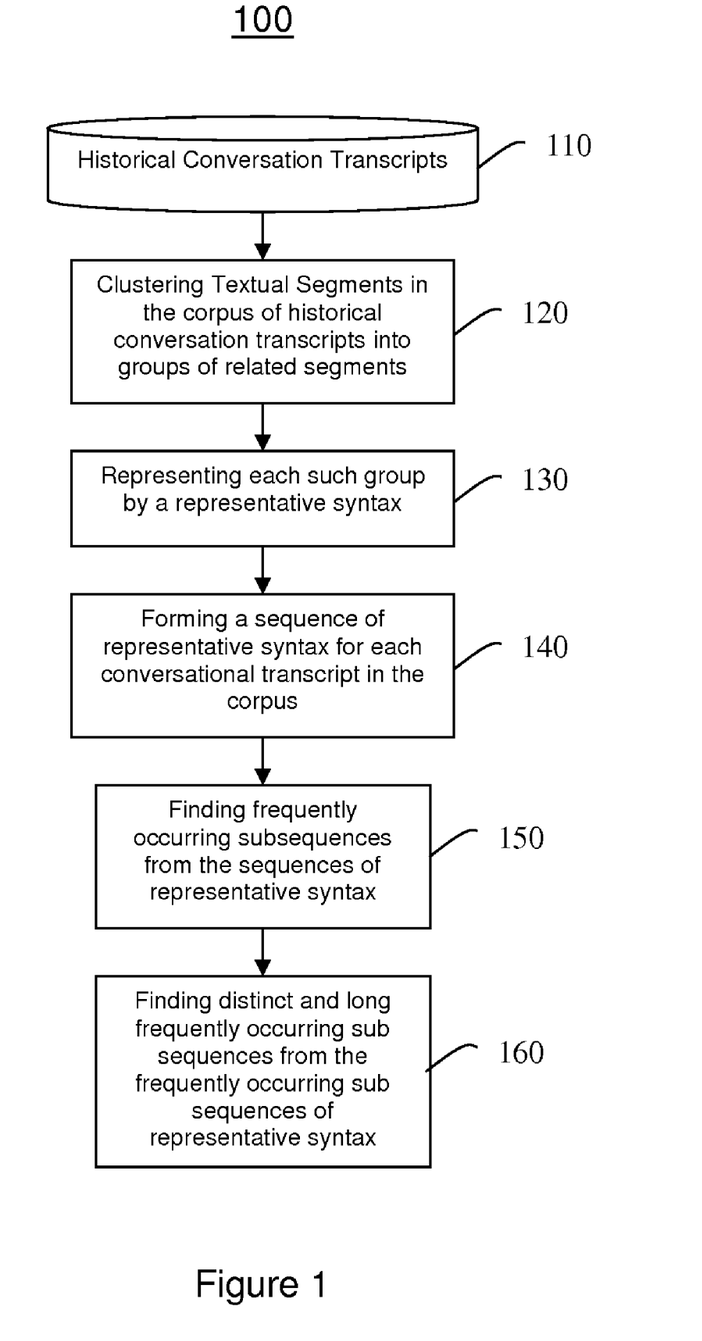
FIG. 1 illustrates an exemplary embodiment of a method of analyzing call transcripts in accordance with this invention.

FIG. 1 illustrates an exemplary embodiment of a method 100 which is the integrated approach of analyzing call transcripts. In 120, the method involves performing clustering of the corpus of call transcripts in order to group related text segments. Each group of segments discovered in 120 is represented by a representative syntax in 130. These groups of segments are also referred to as the sub-procedure text segments (STPS). In 140, the calls are represented as a sequence of STPS. Once the calls have been represented as a sequence of STPS, in 150 mining is performed on the sequence to determine the frequent sequences across the calls. After this, in 160 a clustering algorithm such as CAARD is used to get distinct and long sequences from the sequences that are mined and the results are used in subsequent embodiments.

Figure 4:
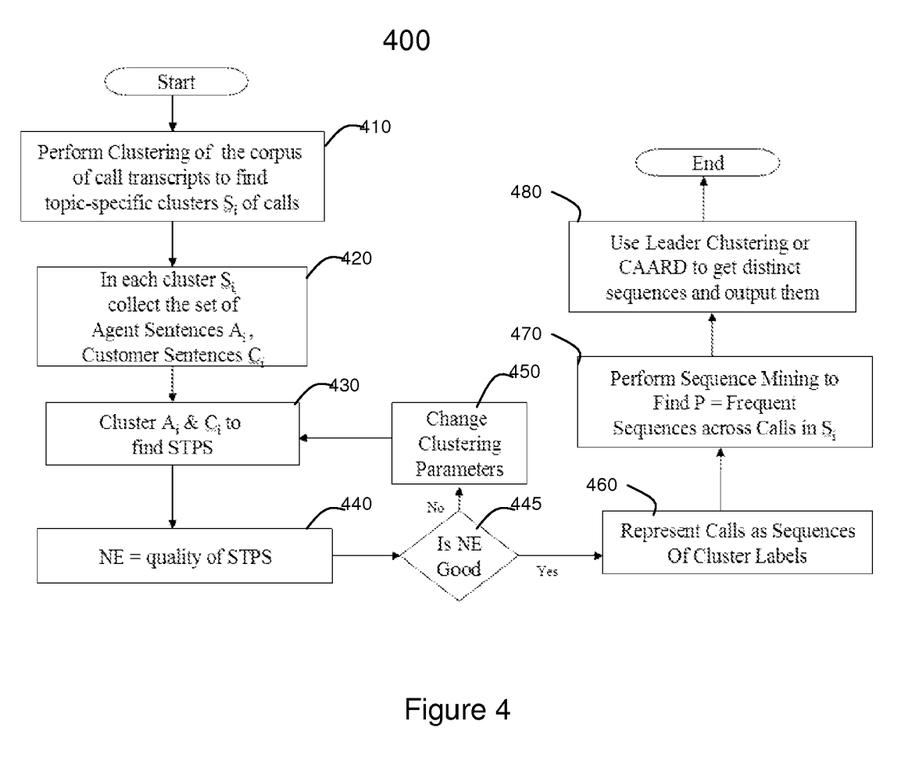
FIG. 4 illustrates an exemplary embodiment of call processing using a clustering algorithm.

Reference is now made to FIG. 4 which illustrates, in more details, an exemplary embodiment of a method 400 which is the integrated approach of analyzing call transcripts. In 410, the method involves performing clustering of the corpus of call transcripts in order to find topic-specific clusters $S_i$ of calls received. In 420, each cluster $S_i$ collects the set of agent (second users) sentences $A_i$ and the Customer sentences (first users) $C_i$. In 430, the sentences $A_i$ and $C_i$ p clustered to find the sub-procedure text segments (STPS). In 440 the entropy which defines the quality of the STPS is computed and in 445 a check is made on the entropy value, which gives the quality of the STPS. If the entropy value computed is not good, i.e., does not satisfy a predefined criteria, in 450 the clustering parameters are changed and the 430 is repeated until the entropy value of the STPS computed is good, i.e., above a predefined threshold. In 445, if the entropy value is determined to be good, i.e., above a predefined threshold then, in 460, the calls are represented as a sequence of cluster labels. Once the calls have been represented as a sequence of cluster labels, in 470 mining is performed on the sequence to determine the frequent sequences across the calls $S_i$. After this, in 480 a clustering algorithm such as CAARD is used to get distinct sequences from the sequences that are mined and the results are output to the first user. The output from the algorithm may be provided directly to the customer or via the agent to the customer.

While clustering the textual segments in the corpus of the historical conversational transcripts, the historical transcripts are organized into groups and conversational transcripts in accordance with predefined criteria, and the groups of conversational transcripts to obtain groups of related textual segments. While clustering groups of conversational transcripts to obtain groups of related documents, at least two set of documents from the groups of documents corresponding each belonging to the customer and the agent are generated. Typically, a K-means clustering is performed on the corpus to obtain groups of conversations on a single topic, to extract coherent and meaningful SPTS from the conversation transcripts. For each such topical cluster, the set of agent sentences and customer sentences are collected separately, and they are clustered adaptively in accordance with 145, until good quality SPTS are obtained.

In a further embodiment, in order to make the output more readable, each SPTS cluster is represented by sentences that characterize the cluster. These characteristic sentences can be obtained using one of text summarization algorithms. The descriptive and discriminative words from the sentences in the cluster are used to describe the cluster. Descriptive words are those that contribute most to the average similarity among the calls in the cluster. Discriminative words are those that are more prevalent in the calls in the cluster as compared to the rest of the calls.

To Provide Information to the Call Participants

Figure 2:
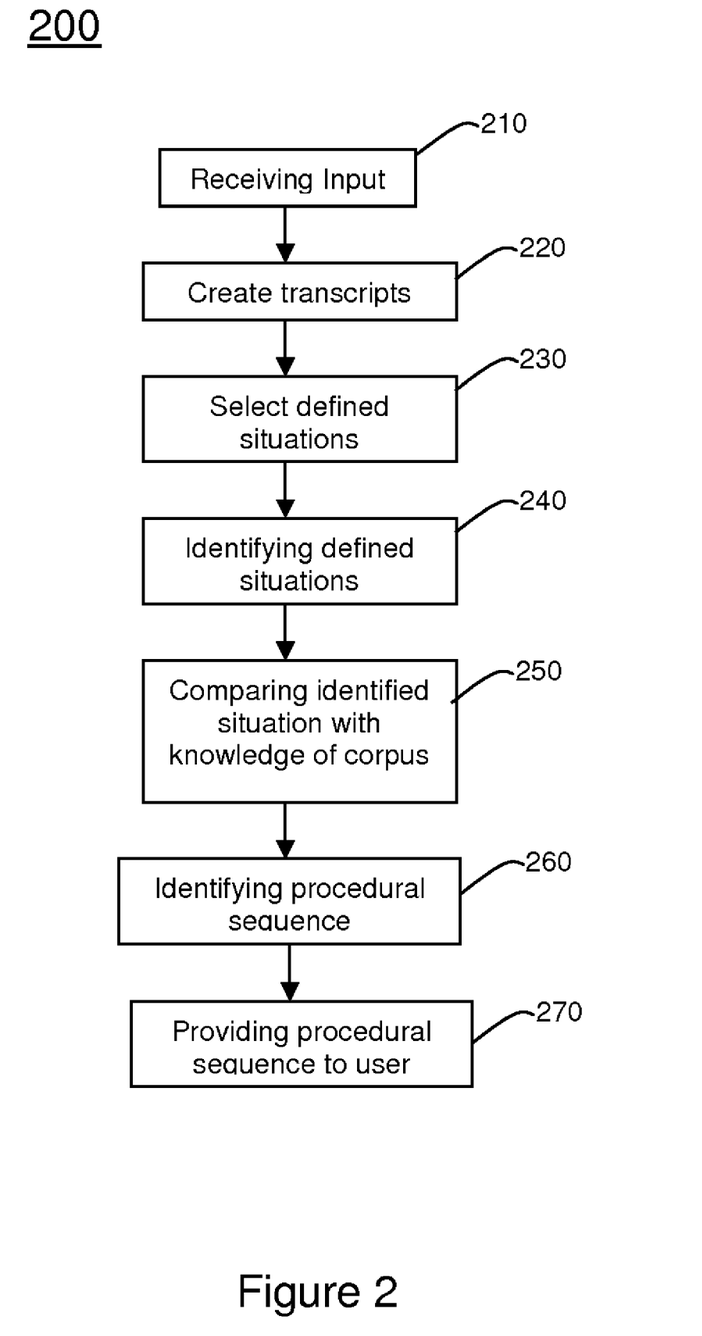
FIG. 2 illustrates an exemplary embodiment of analyzing conversational transcripts and generating documents.

FIG. 2 illustrates an exemplary embodiment of a method 200 of analyzing call transcripts in accordance with the claimed invention. In 210, an input call is received from a customer by an agent. On receiving the call, for example an input voice call, call via an instant messenger, call via email or other means known to a person skilled in the art, preferably a voice call, in 220 conversational transcripts are created from the information received from the call of the customer. After creating conversational transcripts, in 230 at least one defined situation is selected from a list of defined situations, where each situations is uniquely defined by a set of parameters. In 240, from the set of defined situations that are derived from the conversational transcript, at least one situation is selected. This selection can be based on a threshold value which has been predefined. Once a selected situations in the conversational transcripts has been identified in 240, a set of procedural sequences is identified by comparing the at least one identified situation in the conversational transcript with knowledge derived from a corpus in 100, for example a set of distinct and long frequently occurring subsequence of STPS as in 160. Once the set of procedural sequences has been identified, in 170, the customer is provided with the identified procedural sequences, either directly or via the agent.

To Author New Information to Include in Knowledge-Base

Figure 3:
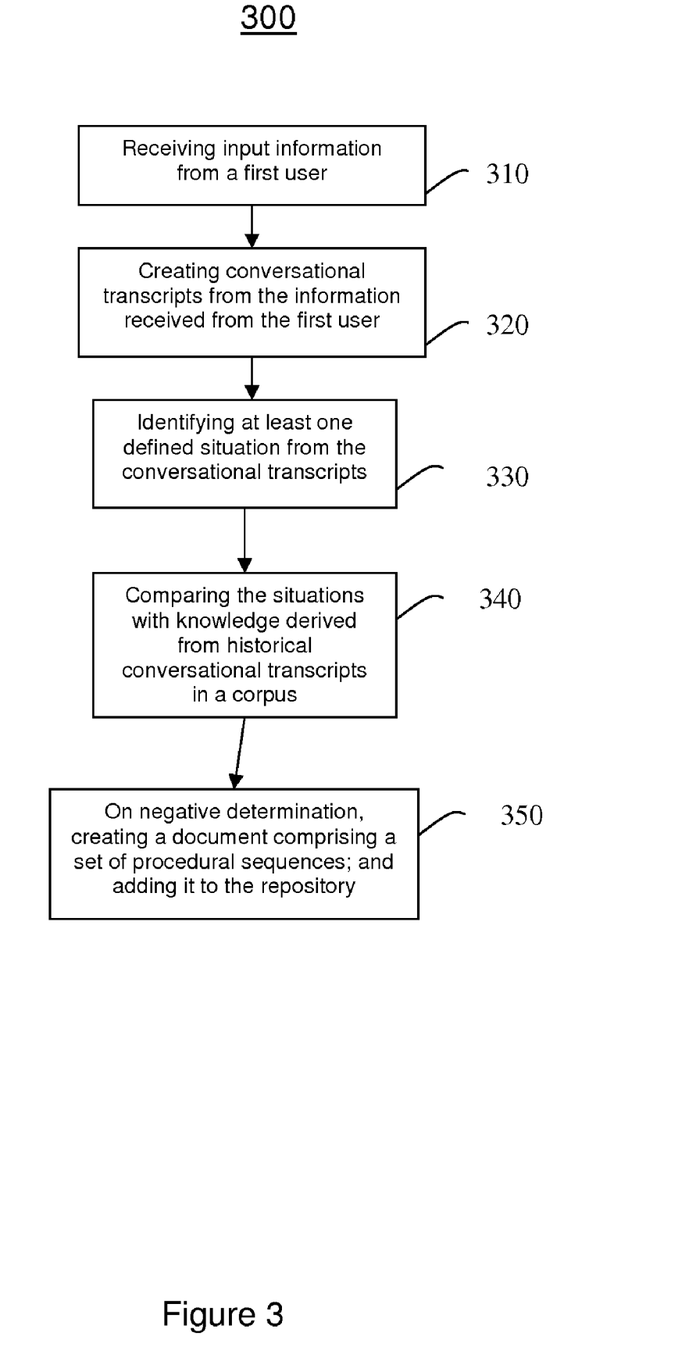
FIG. 3 illustrates an exemplary embodiment an analyzing conversational transcripts.

FIG. 3 illustrates an exemplary embodiment of a method 300 of analyzing the call transcripts in order to determine and author new information to incorporate in an already existing knowledge-base. In 320, conversational transcript of the received call is created. From the conversational transcript, at least one defined situation in the list of defined situations is identified in 330. In 340, the identified situation is compared with the knowledge repository derived from the historical conversation as in 100. Once identified situation is not found in knowledge repository, a new document comprising a set of procedural sequences is created and added to the knowledge repository.

Determining the Quality of the Cluster

Call Entropy: A Measure of Scatter for a Call

A typical call consists of a sequence of information exchanges and assumes that there exist some sentences in a conversation that reflect sub-procedures steps. The goodness measure (hereinafter referred to as goodness) of the SPTS cluster can be partially judged by the frequency of calls that contains sentences from each SPTS cluster, and the number of calls the sentences in each SPTS cluster are scattered into. This intuition is quantitatively captured by defining entropy of a call with respect to the SPTS clusters. Let, Call1 be represented by the sequence $<C_2, C_1, C_5, C_6, C_4>$ and Call2 by the sequence $<C_3, C_5, C_5, C_3, C_5>$. As is obvious from the representation, Call1 is more scattered than Call2. The entropy measure is used to measure the scatter of a call. Let, $E_C(c)$ represent entropy with respect to a given set C of SPTS clusters. The entropy measure is computed using Eq. (1):

$$E_C(c) = -\Sigma_i d_i \log(d_i), \quad (1)$$

where in Eq. (1), $d_i$ is the fraction of the call C in a cluster i. For example, for the clusters numbered $C_1$ to $C_6$, E(Call1)=0.6989, and E(Call2)=0.29.

Normalized Entropy Adaptation to Compare Calls Across Cardinalities

Entropy is satisfactory measure to compare calls of the same cardinality. Consider the case of Call3 which is <$C_1$, $C_2$> and Call4 which is <$C_1$, $C_1$, $C_1$, $C_1$, $C_2$, $C_2$, $C_2$, $C_2$>, which have the same entropy. Therefore, Call3 should have a higher score since it is scattered across as many clusters as it can be. Thus, a Normalized Entropy (NE) is proposed which is a better measure of scatter of the call. NE of a call c with respect to a set C of clusters is defined as $$NE_C(c) = -(\Sigma_i d_i \log(d_i))/\log(|c|), \quad (2)$$

where in Eq (2), |c| is the length of the call c. Normalized Entropy would lie between a value between 0 and 1 since log(|c|) is the maximum value that Normalized Entropy takes. Call3 would have an NE value of 1.0 and Call4 would have an NE value of 0.333.

Quality Measure for a Clustering on a Collection of Calls

Thus, a quality measure for a given set C of clusters is defined using the normalized entropy of all the calls in the corpus R, as the cardinality weighted average of NE values for calls as defined in Eq. (3):

$$NE_R(C) = (\Sigma_{c \in R} NE_C(c) * |c|)/(\Sigma_{c \in R} |c|). \quad (3)$$

Important properties of the NE measure:

NE increases with the number of clusters because, there are more clusters for a given call to get scattered into.

For a given number of clusters and an approximately equal number of data elements, NE decreases with the increase in average call length. This is due to the increased probability of two steps (in the call) getting mapped to the same cluster with increase in the length of a call.

NE is parameterized by both the clusters and the corpus. Hence, a comparison can be made between the clustering algorithms by their NE values on various corpora, and different corpora by their NE values when subjected to the same clustering technique. However, the characteristics of the NE function outlined previously leads to two important requirements for NE value based comparison. The clusters to be compared should have roughly same values for the following ratios Sentences ratio: Number of sentences to be clustered/Number of clusters Call length ratio: Average Call Length/Number of clusters Analysis of Corpus Homogeneity Using NE Measure A corpus of call collections would contain calls pertaining to diverse issues. A clustering of agent sentences and customer sentences of such a corpus, would lead to topic-type clusters than SPTS clusters. A homogeneous corpus could be expected to give better SPTS clusters than a more diverse collection, based on the assumption that the larger dissimilarities (which are topic-level) have to be eliminated in order to expose the lesser (SPTS) dissimilarities to the clustering algorithm. Therefore, in this invention it is hypothesized that NE of the clusters increases with the homogeneity of the corpus of calls to be clustered.

Mining of STPS Cluster Sequences

Frequent Sequences

This describes the technique of extracting useful information from the call sequences by means of frequent sequence mining. Mining sequential patterns from data is well known to a person skilled in the art. Algorithms available in the art can be used to find frequent sequences from the set of call sequences. However, these algorithms result in many redundant sequences. Hence, summarization techniques like CAARD to find long and distinct sequences can be advantageously used. Such a sequence mining approach 300 has been illustrated in FIG. 3 where in accordance with this invention distinct frequent sequences can be extracted.

Calls as Cluster Sequences

Figure 5:
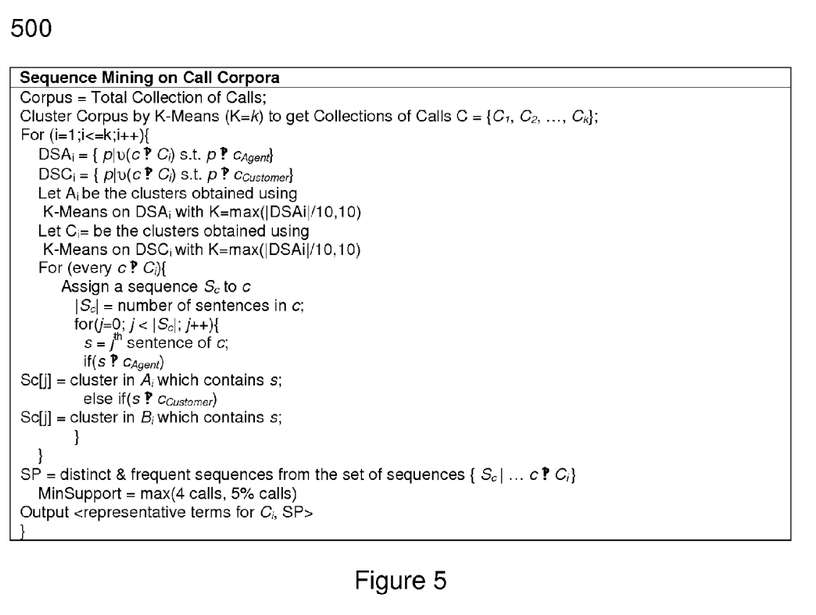
FIG. 5 illustrates an exemplary embodiment an algorithm used in sequence mining on call corpora.
Figure 6:
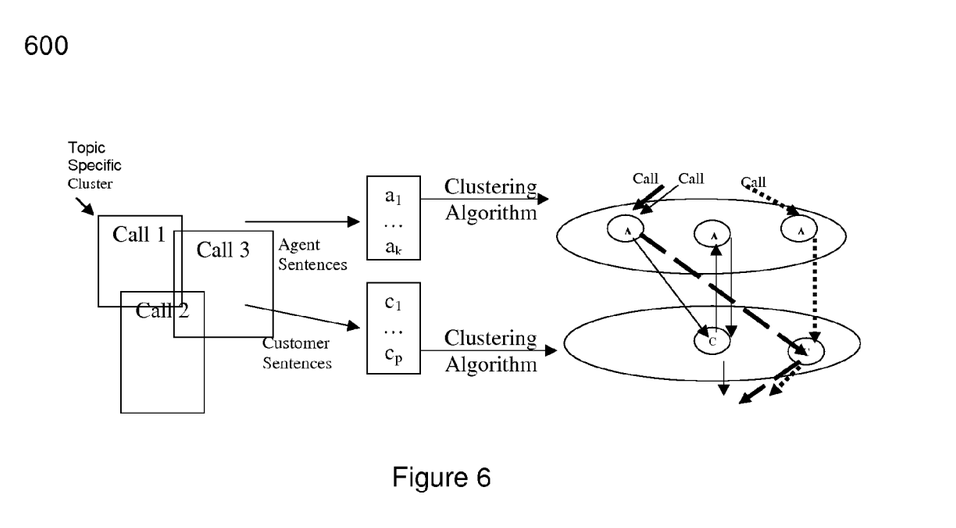
FIG. 6 illustrates an exemplary embodiment of authoring new knowledge and updating the knowledge base.

Let, $\{C_1, \ldots, C_n\}$ be the clusters of sentences corresponding to customer and $\{A_1, \ldots, A_m\}$ be that to agents. Each call is represented by a sequence of those clusters to which sentences in the call belong to. For example, <START, $A_2$, $C_1$, $A_4$, $C_4$, END> represent a call where the first sentence in the call, which is in $A_2$, was spoken by agent, second sentence, which is in $C_1$, is spoken by customer, and so on. Without any loss of generality it can be assumed that the call consists of sentences belonging to As and Cs alternatively as illustrated in FIG. 4. FIG. 4 illustrates an exemplary embodiment 400 of splitting calls received as inputs into agent sentences and customer sentences, clustering these sentences and representing calls as a sequence of clusters. Consecutive sentences by the same person can be combined into a single sentence. Once the distinct sequences of SPTS clusters, these sequences are added to the procedure repository Examples Agent Prompting Application Using SPTS Cluster Sequences Repository Consider, an agent prompting application is an online process as illustrated in FIG. 5, consisting of extraction of procedures from a voice call. An ASR (Automatic Speech Recognition) system at any time during the call has the transcript of the call up to that point in time. A call transcript to the procedure matcher happens periodically in the call (say, once in 30 seconds or so), where the procedure matcher finds the closest matching procedure(s) from the repository of procedures, as described by the method in accordance with this invention previously, to the call transcript. The matched procedure(s) is (are) displayed to the agent. The agent would be able to take clues from the displayed matching procedure(s) to decide on actions to be taken in the remaining part of the call.

Assume that a laptop help-desk agent receives a call on resetting a user password. There could be two ways of resetting the user password in Windows OS:

1. pressing Ctrl+Alt+Delete and press on change password button to change the password, and
2. opening control panel, clicking on "user accounts" icon to change the password.

These two procedures if present in the procedure database are retrieved and shown to the agent while taking the call on user password resetting in Windows OS Knowledge Authoring Application Using SPTS Cluster Sequences Repository The Knowledge Authoring application is an offline process aimed at capturing any new knowledge which has not been recorded in the procedure DB for possible inclusion into the knowledge base. FIG. 3 illustrates an exemplary embodiment of use of extracted procedures in knowledge authoring. This is a semi-supervised process where whether or not the suggested new knowledge is worthy of inclusion into the knowledge base is left to the discretion of the knowledge author.

For example, suppose a laptop helpdesk agent, while conversing with a customer, has diagnosed and fixed an unknown problem or diagnosed a known problem but fixed the problem in a way that is not captured in the knowledge base that he typically uses. If this type of the call is discovered then, the person who is responsible for maintaining the knowledge base, could generate a document related to this call, capturing the new knowledge and store the new knowledge in the knowledge base. After completion of a call, the call transcript is fed into the procedure matcher that finds procedure that match with the call (based on a threshold). If matching procedure for the call is not found, the knowledge author is prompted to possibly include the new knowledge captured into a document format and then updated into the knowledge base.

Although the invention has been described with reference to the embodiments described above, it will be evident that other embodiments may be alternatively used to achieve the same object. The scope of the invention is not limited to the embodiments described above, but can also be applied to software programs and computer program products in general. It should be noted that the above-mentioned embodiments illustrate rather than limit the invention and that those skilled in the art will be able to design alternative embodiments without departing from the scope of the appended claims. In the claims, any reference signs should not limit the scope of the claim. The invention can be implemented by means of hardware and software comprising several distinct elements.

What is claimed is:

1. A computer-implemented method for analyzing transcripts of conversation between at least two users, the method comprising:
    receiving, by a computer, input information from a first user;
    creating, by said computer, a conversational transcript from said input information received from said first user;
    selecting, by said computer, a defined situation from a list of defined situations to filter said conversational transcript;
    comparing, by said computer, said defined situation with knowledge derived from historical conversational transcripts to identify a set of procedural sequences, said comparing comprising:
        clustering, by said computer, textual segments in said historical conversational transcripts into groups of related textual segments;
        representing, by said computer, each of said groups of related textual segments by a representative syntax;
        forming, by said computer, a sequence of said representative syntax for each conversational transcript;
        finding, by said computer, frequently occurring subsequences from said sequence of representative syntax; and
        finding, by said computer, distinct and long, frequently occurring subsequences from the frequently occurring subsequences that are identified with said defined situation;
    identifying, by said computer, said defined situation in said conversational transcript;
    identifying, by said computer, a set of procedural sequences by comparing said defined situation in said conversational transcript with knowledge derived from said historical conversational transcripts; and
    providing, by said computer, said set of procedural sequences to said first user.

2. The method of claim 1, said knowledge derived from said historical conversational transcripts comprising:
    clustering textual segments in said historical conversational transcripts into groups of related textual segments;
    representing each of said groups of related textual segments by a representative syntax;
    forming a sequence of said representative syntax for each historical conversational transcript;
    finding frequently occurring subsequences from said sequence of representative syntax; and
    finding distinct and long frequently occurring subsequences from said frequently occurring subsequences.

3. The method of claim 2, said clustering textual segments comprising:
    organizing said historical conversational transcripts into groups of conversational transcripts according to a defined criteria; and
    clustering said groups of conversational transcripts to obtain said groups of related textual segments.

4. The method of claim 3, said clustering said groups of conversational transcripts further comprising:
    generating at least two sets of documents from said groups of conversational transcripts.

5. The method of claim 2, each said sequence of representative syntax comprises a segment of conversational transcripts belonging to each of said groups of related textual segments.

6. The method of claim 2, said sequence of representative syntax comprising a set of frequent and distinct words in each of related textual segments.

7. The method of claim 2, said finding distinct and long frequently occurring sub-sequences being performed by a clustering algorithm belonging to the class of leader clustering algorithm.

8. The method of claim 2, said clustering textual segments in said historical conversational transcripts into groups of related textual segments further comprising utilizing a set of configurable clustering parameters to cluster said related textual segments.

9. The method of claim 1, further comprising:
    prompting a second user on appropriate procedural sequences based on said defined situation, said second user providing said appropriate procedural sequence to said first user.

* * * * *